United States Patent
Conklin

[15] 3,664,445
[45] May 23, 1972

[54] AVAILABLE LIGHT ILLUMINATED INSTRUMENT READ-OUT

[72] Inventor: Joseph P. Conklin, Fairfield, Conn.
[73] Assignee: Pitney-Bowes, Inc., Stamford, Conn.
[22] Filed: May 5, 1969
[21] Appl. No.: 821,835

[52] U.S. Cl. ...................177/45, 177/50, 177/178, 353/40, 353/3
[51] Int. Cl. ............G01g 23/18, G01g 23/30, G03b 21/00
[58] Field of Search.................353/40, 41, 42, 3, 1; 116/114.12, 114.13; 177/178

[56] References Cited

UNITED STATES PATENTS

| | | | |
|---|---|---|---|
| 1,065,757 | 6/1913 | Wilson | 353/3 |
| 2,022,144 | 11/1935 | Nicolson | 353/3 |
| 2,322,813 | 6/1943 | Beck | 177/178 |
| 2,273,591 | 2/1942 | Powell | 177/178 |
| 2,471,800 | 5/1949 | Von Mulinen | 353/40 |

Primary Examiner—Leonard Forman
Assistant Examiner—A. J. Mirabito
Attorney—William D. Soltow, Jr., Albert W. Scribner and Martin D. Wittstein

[57] ABSTRACT

A read-out for an instrument such as a postal scale which provides either a discrete postal weight range classification or a quantitative weight read-out. The light used for this purpose is merely the available light collected by a plastic prism and internally reflected toward a back-lighted display. In the discrete form of read-out, the display includes a plurality of light pipes, each one of which represents a possible output indicator to be illuminated. Which one is illuminated depends upon the position of a mask which moves in response to the weight indication of the postal scale, and has a transparent window which lines up with the selected one of the light pipes.

1 Claim, 9 Drawing Figures

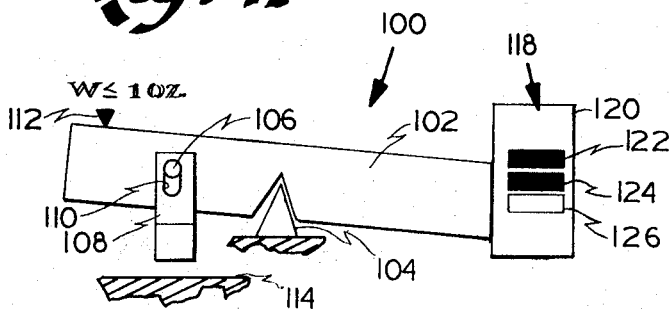
fig 1-A
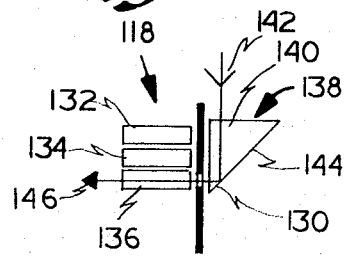
fig 1-B
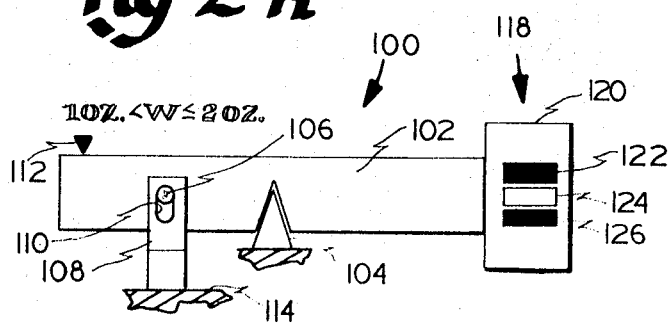
fig 2-A
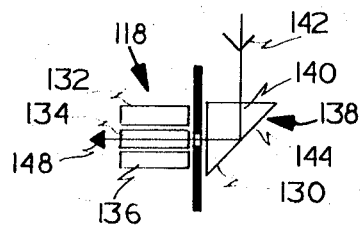
fig 2-B
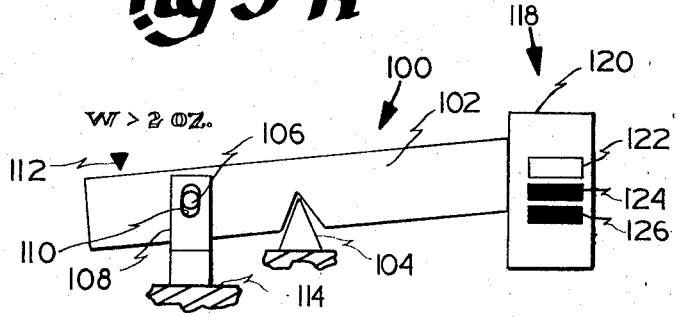
fig 3-A
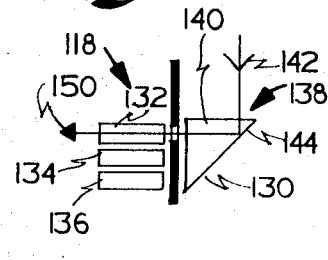
fig 3-B
*INVENTOR.*
JOSEPH P. CONKLIN

INVENTOR.
JOSEPH P. CONKLIN
BY
Albert W. Scribner
ATTORNEY

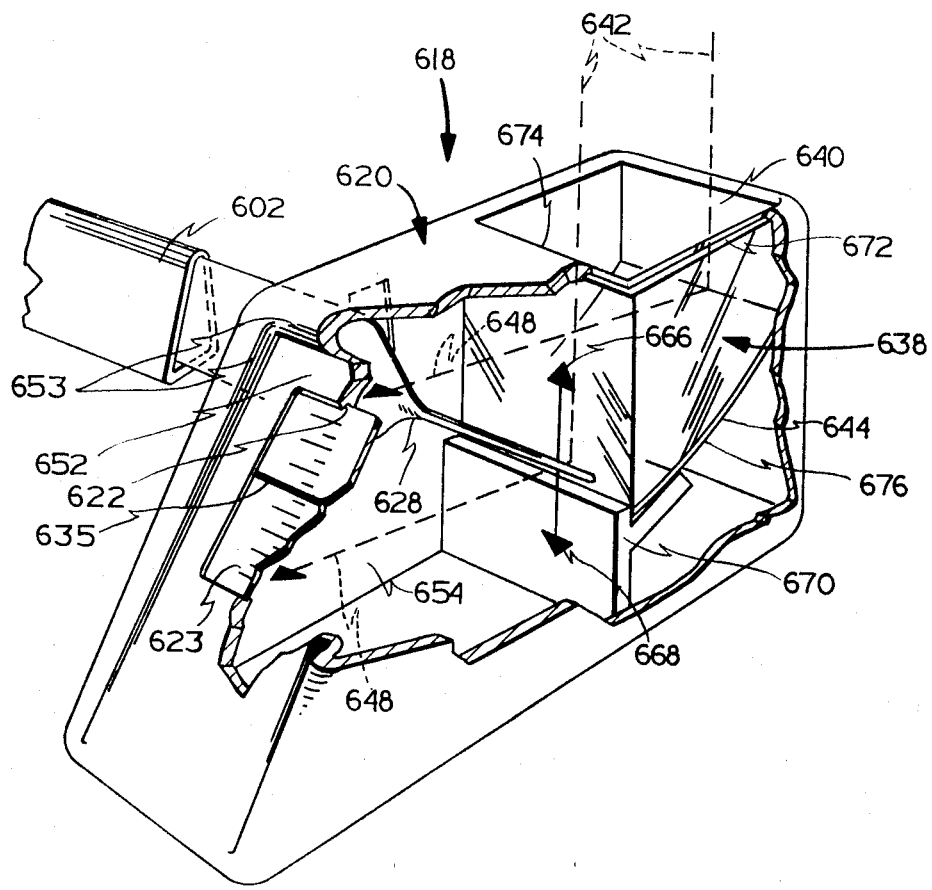

3,664,445

AVAILABLE LIGHT ILLUMINATED INSTRUMENT READ-OUT

FIELD OF THE INVENTION

The invention relates to a read-out for instrumentation of various kinds, and particularly concerns an available light illuminated read-out for a postal scale.

THE PRIOR ART

In recent years considerable attention has been given to the field of human engineering, in an attempt to design apparatus with input and output requirements which are better matched to human operators. Focusing specifically on the problem of information output, one of the most successful approaches to the design of read-outs has been the use of light to back-illuminate an indicator so as to make it stand out sharply by contrast with the background. This readily enables the human eye to pick out the illuminated indicator, and provides an efficient man-machine interface.

Illumination is particularly effective in designing read-outs of the digital or discrete type, as distinguished from the analog or continuous type in which the indication is in the form of a pointer moving across a dial or chart. A good example of a discrete read-out instrument is a postal scale which does not indicate the weight of a piece of main in quantitative terms, but merely indicates the postal weight range into which the mail falls, so that the user knows how much postage to apply.

In the past, illuminated read-outs for postal scales and similar small, portable table-top instruments have been troublesome to design. They generally have required some form of internal light source within the instrument housing, which could be battery-operated or A.C.-operated. The disadvantage of using a battery as a power source is of course that the battery has a limited life and needs replacement. In addition batteries have a tendency to leak and cause corrosion if they are left in place too long. A.C.-operated light sources also have their disadvantages, including shock hazard and the necessity for power cord which limits the portability of a small instrument, restricts its use to indoor environments, and presents something of a tripping hazard. In addition, A.C. devices generate a good deal of heat and may require special ventilation or cooling. Finally, all light bulbs, regardless of the power source, require occasional replacement, which is an inconvenience to the operator and also complicates the design of the instrument by requiring some sort of access to the interior of the housing.

THE INVENTION

This invention solves the foregoing problems by providing an available light back-illuminated read-out for a small instrument. The instrument has a actuator which moves in response to a measured condition. The read-out has a transparent display means with front and rear surfaces, and is arranged to represent different measurements at different locations on the front surface. Available light strikes the rear surface and is transmitted to illuminate at least a part of the front surface, while means interposed in the path of the light are moveable thereacross in synchronism with the motion of the actuator to divide the front surface into illuminated and shadowed portions, one of which is so positioned relative to the measurement representations as to indicate the measured condition.

In an instrument which displays a plurality of discrete indications, the read-out comprises a plurality of discrete light pipes located in spaced side-by-side relationship, each light pipe corresponding to one of the discrete instrument output indications. An opaque shutter is formed with a transparent window sized to admit light to one of the pipes at a time, and is moveable in response to the instrument output to locate the window opposite a different one of the light pipes for each output indication.

No internal light source is required, and the instrument is devoid of light bulbs, batteries, or A.C. power connections. Thus bulb and battery replacement are avoided, there is no need for frequent access to the interior of the instrument housing, heat is not generated internally, no special ventilation or cooling is required, and the hazards of tripping and electric shock are eliminated.

BRIEF DESCRIPTION OF THE DRAWINGS

FIGS. 1A and 1B are schematic illustrations of a postal range scale employing a discrete read-out in accordance with this invention, showing the condition of the scale and read-out when the material being weighed is below the lower limit of the postal range.

FIGS. 2A and 2B are similar schematic illustrations, but show the condition of the scale and read-out when the material being weighed is within the postal range.

FIGS. 3A and 3B are similar schematic illustrations, but show the scale and read-out when the object being weighed is above the upper limit of the postal range.

And FIG. 6 is a perspective view, with parts broken away for clarity of illustration, of an alternative type of read-out in accordance with this invention.

The same reference characters refer to the same elements throughout the several views of the drawing.

DETAILED DESCRIPTION OF THE PREFERRED EMBODIMENTS

Figure 4:
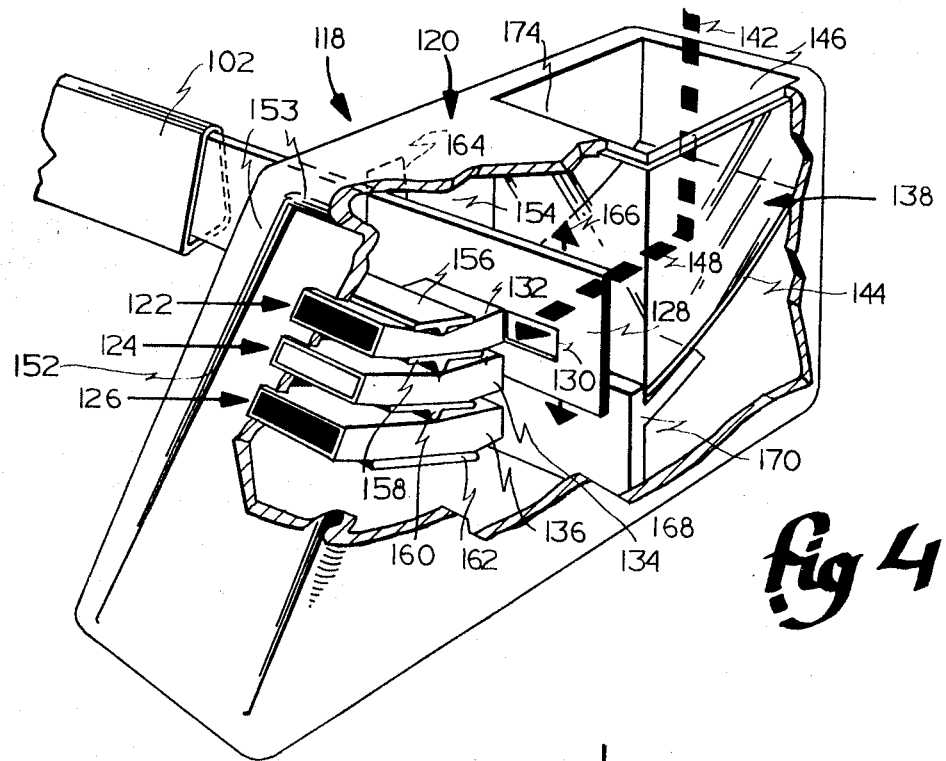
FIG. 4 is a perspective view, with parts broken away for clarity of illustration, showing the details of construction of the discrete read-out of the preceding figures.

The present read-out operates to produce a visual output indication, which may be either discrete or continuous. The application of the read-out to an instrument which measures discrete ranges rather than exact quantities is best illustrated with reference to a postal weight range scale. Such scales are ordinarily small, portable table-top devices which indicate only the postage which a letter requires, rather than its weight. Such a device should be free of power cords, and should not have bulky, heat-generating internal light sources or require replacement of light bulbs or batteries; yet it can benefit greatly from the advantages of an illuminated read-out.

FIGS. 1 through 5 accordingly illustrate the application of a discrete form of illuminated read-out in accordance with this invention to a postal range scale, specifically one of the kind disclosed in co-pending Pat. application Ser. No. 821,836, filed May 5, 1969 by Henry Korth and Herbert Tramposch, now U.S. Pat. No. 3,545,556, and entitled "Weight Range Scale," which application has a common assignee with the present one. Briefly, such a postal range scale 100 includes a weighing beam 102 which pivots on a fulcrum 104 and has a pin 106 projecting therefrom to support an auxiliary weight 108 having an elongated slot 110 to receive the pin 106. The letter or other object to be weighed exerts a force on the beam 102 at the left side of the fulcrum 104, as indicated by arrow 112.

As seen in FIG. 1A, when the weight of the object is less than or equal to one ounce, the combined weight of the object and the auxiliary weight 108 is not sufficient to tip the beam 102. But if, as illustrated in FIG. 2A, the object weights more than one ounce, and less than or equal to two ounces, the beam 102 tips and rotates counter-clockwise about fulcrum 104 until the auxiliary weight 108 comes to rest against a support 114. When the weight 108 strikes the support, it no longer contributes to the tipping force on the beam 102, so that the beam stops in the position illustrated in FIG. 2A. As seen in FIG. 3A, when the object to be weighed exceeds two ounces, its weight alone is sufficient to tip the beam 102 to and beyond the point at which the weight 108 strikes the support 114. As the beam tips further, the pin 106 rides downwardly in the elongated vertical slot 110.

Thus the postal range scale 100 operates in a digital, or discrete, mode. It has three distinct positions relative to a particular postal weight range: the position of FIG. 1A for mail below the weight range, the position of FIG. 2A for mail within the range, and the position of FIG. 3A for mail beyond the range.

Schematically illustrated in FIGS. 1B, 2B and 3B, and at the right hand side of FIGS. 1A, 2A and 3A, is a read-out 118 in accordance with this invention which is adapted for use with the postal range scale 100, as well as with other discrete or digital instruments. The read-out comprises a housing 120 formed with three display windows 122, 124 and 126 respectively. The object of the read-out, in terms of the described operation of the scale 100, is to illuminate window 126 as seen in FIG. 1A when the mail is underweight, to illuminate window 124 as seen in FIG. 2A when the mail is within the weight range, and to illuminate window 122 as seen in FIG. 3A when the mail is overweight.

FIGS. 1B, 2B and 3B, which show the read-out 118 in the same operating conditions as FIGS. 1A, 2A and 3A respectively, schematically illustrate the operation of the invention. Within the housing 120 is an opaque mask or shutter 128 secured to the right hand end of the scale beam 102 and moveable vertically therewith to assume three discrete positions for underweight, in-range, and overweight conditions respectively. Aligned with the three display windows 122, 124, and 126 are three light pipes 132, 134 and 136 respectively. A transparent window 130 formed in the opaque mask 128 lines up alongside the lowermost pipe 136 as seen in FIG. 1B when the mail is underweight, alongside the middle light pipe 134 as seen FIG. 2B when the mail is within the range, and alongside the uppermost light pipe 132 as seen in FIG. 3B when the mail is overweight. A prism 138 is positioned so that an upwardly facing entry surface 140 thereof gathers downwardly incident light presented by arrow 142, and a reflecting surface 144 thereof internally reflects the light toward all three light pipes 132, 134, and 136. The mask 128 blocks all of the reflected light except the limited portion thereof which can pass through the transparent window 130. Thus when the mail is underweight light emerges only through the light pipe 136 as illustrated by arrow 146 in FIG. 1B, and only the lowermost window 126 is illuminated. When the mail is within the range, the light emerges only from light pipe 134 as indicated by arrow 138, and only the middle window 124 is illuminated. Finally when the mail is overweight, the light emerges only through light pipe 132 as indicated by arrow 150, and only the uppermost window 122 is illuminated.

Figure 5:
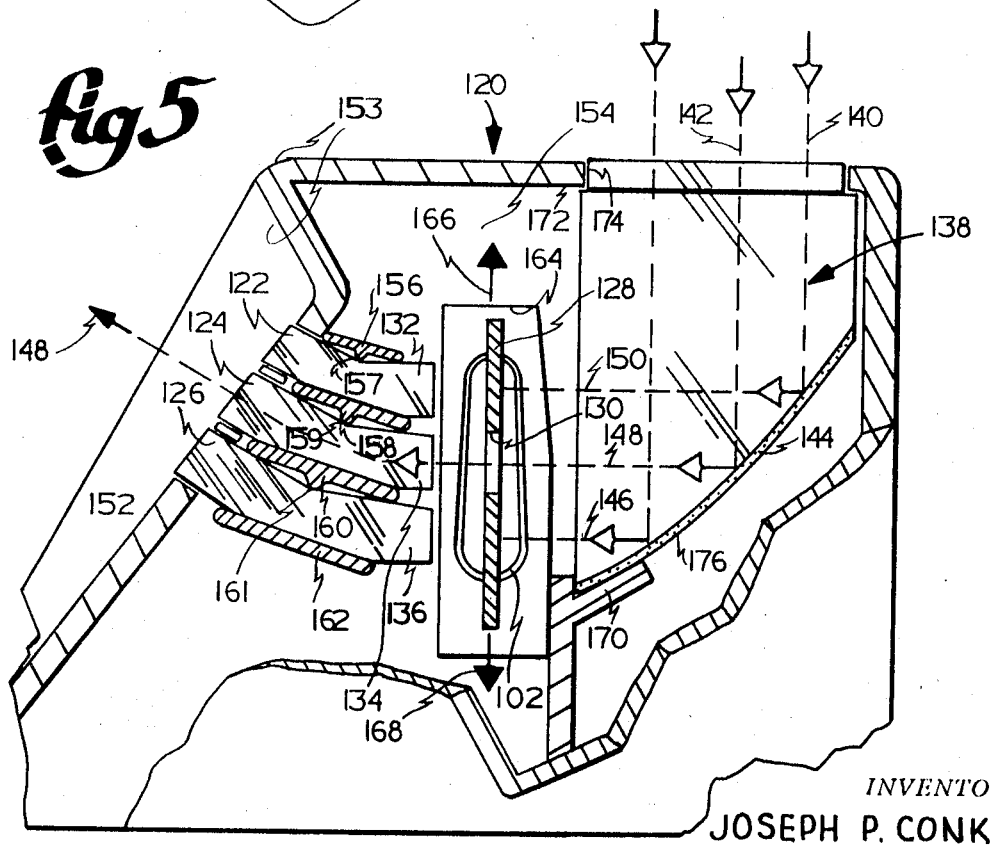
FIG. 5 is a side elevational view, with parts broken away and sectioned for clarity of illustration, of the same read-out.

FIGS. 4 and 5 show the detailed construction of the discrete read-out 118. There it is seen that the housing 120 has a generally trapezoidal shape, the slanted front face thereof being formed with a depression 152 which defines surrounding ridges 153 above and on either side of the depression 152. This depression surrounded by the ridges forms a shaded recess within which to view the illuminated display windows 122, 124 and 126, in the manner of a viewing hood. This serves to make maximum use of the available light, i.e. the ambient light 142 which is downwardly incident upon the top face 140 of prism 138.

The far wall 154 of the read-out housing 120 is formed with horizontally projecting shelves 156, 158, 160 and 162 which retain and space the light pipes 132, 134 and 136. The projecting shelves 156, 158, 160 and 162 may be integrally molded with the housing 120, using any common plastic material. In the molding process, suitable apertures are formed in the depressed wall 152 to define the display windows 122, 124 and 126. The light pipes 132, 134 and 136 may be formed of any transparent material, such as glass or molded polymethyl methacrylate (Lucite), which has excellent light-conducting properties and is even able to direct light over a curved path by internal reflection. Making use of this property, each of the light pies 132, 134 and 136 is curved generally upwardly as indicated by arrow 148 so that the light which passes through any one of the pipes emerges on an upwardly slanted path through the associated display window 122, 124 or 126, making the display easier to read when it is on a table top, below eye level. The rearward slant of the housing wall 152 further aids in the reading of the display from above. The shelves 156, 158 and 160 are formed with ridges 157, 159 and 161 respectively, to accommodate the curvature of the light pipes.

The far wall 154 is further formed with an aperture 164 through which projects the mask 128 secured to the end of the scale beam 102. The mask may be formed of any opaque material, and the aperture 130 formed therein is of just the right size to admit light to only one of the light pipes at a time. The scale beam 102 and mask 128 move upwardly or downwardly together as indicated by arrows 166 and 168 respectively, to assume three discrete read-out positions, depending upon the weight of the mail in relation to the postal range. The size of the aperture 164 of course must be large enough to accomodate this vertical movement.

The prism 138 may be made of a material such as glass or Lucite, and rests on a forked supporting bracket 170 which is integrally molded with the housing 120 and engages the lower corner of the prism so as to restrain it against both horizontal and vertical movement. The upper end of the prism 138 is formed with shoulder 172 around its perimeter to engage with the margins of a light admitting opening 174 formed in the upper surface of the housing 120. The light admitting opening 174 allows the downwardly incident light represented by arrows 142 to enter the prism 138, and the engagement between the shoulder 172 and the margins of the opening helps retain the prism 138 in place.

The prism surface 144 is slightly curved to converge the reflected light toward the light pipes 132, 134 and 136. In addition it is covered with a coating of silver or other highly reflective material 176 so as to reflect a maximum percentage of the light collected. Of course, all of the reflected light (see for example arrows 146 and 150) is blocked by the mask 128 except for that portion (e.g. arrow 148) which passes through the aperture 130 and reaches one of the light pipes (specifically light pipe 134 in the example illustrated).

This invention is applicable also to a continuous read-out. In FIG. 6 there is seen an alternative form of available light illuminated read-out 618 in accordance with this invention, specifically designed for use with a continuous type of instrument. A postal scale again is arbitrarily selected for the purpose of illustration, but in FIG. 6 the scale is of the type which provides a continuous quantitative indication of the actual weight. It has a weighing beam 602 terminating in a pointer 628 that moves vertically with the beam (as shown by arrows 666 and 668) to a position dependent upon the weight of the mail. The pointer 628 extends through a suitable opening in a wall 654 of the read-out housing 620. The latter housing has a sloping front wall formed with a depression 652 and surrounding ridges 653 which define a viewing hood. A display window 622 is formed in the housing wall within the depression 652, and receives a ground glass screen 623 upon which are recorded markings comprising a continuous analog weight indicating chart.

The housing 620 is further formed with an upwardly opening light admitting window 674 through which emerges the top face 640 of a glass or Lucite prism 638. Downwardly incident available light represented by arrows 642 enters the window 674 and the prism face 140, and is reflected internally of the prism by a curved surface 644 which is provided with a silver coating 676.

Exemplary light beams reflected from the surface 644 and coating 676 are represented by arrows 648. The locus of all such reflected light beams forms a tapering wedge of light which converges toward the ground glass screen 623. The upper edge of the tapering wedge of light falls at the upper edge of the display window 622, while the lower edge of reflected wedge of light falls at the lower edge of the window 622. The reflected light serves to back-illuminate the weight indicating chart on screen 623, and none of it is blocked by the pointer 628 except for a small horizontal shadow line 635 which reads out the weight in quantitative terms against the chart. The slant of the depressed housing face 652 allows the ground glass screen 623 to face upwardly for easy reading when looking down upon the postal scale at table height.

It will now be appreciate that the read-out of this invention requires no internal light source, yet provides a bright and readable back-illuminated display which makes maximum use of available light and is particularly designed for easy reading when looking downwardly toward an instrument situated on a table. The lack of an internal light source avoids the disadvantages of heat generation, the need for replacement of light bulbs and batteries, and the weight and danger associated with 110 volt power supplies. The invention is particularly advantageous for use with the type of read-out in which only one of a plurality of windows is illuminated to give an instantly readable indication of the postal range or other discrete factor.

Since the foregoing description and drawings are merely illustrative, the scope of protection of the invention has been more broadly stated in the following claims; and these should be liberally interpreted so as to obtain the benefit of all equivalents to which the invention is fairly entitled.

The invention claimed is:

1. In a scale having a frame and a beam that is pivotally mounted on said frame and is movable between three distinct operative positions, one position indicating that the object being weighed is within a predetermined weight range, while the second and third positions thereof indicate that the object weight is respectively above and below said weight range;

a display device mounted on said frame and disposed in front of the outer free end of said beam, said display device including three vertically spaced separate window means;

an ambient light gathering and directing prism mounted on said frame and disposed on the rear side of the outer free end of said beam and in alignment with said window means;

an opaque mask mounted on the free end of said beam and being movable with said beam to three positions between said prism and display means, said mask having a light transmitting slit formed therein;

the said three operative positions of said beam serving to position said slit in registry with said three window means respectively so that the ambient light gathering, directing and masking action of said prism and mask will produce an illumination in that window means associated with the weight class of the object that is being weighed.

* * * * *